Aug. 4, 1931.  M. C. BAILEY  1,817,867

STUFFING BOX AND GLAND

Filed March 10, 1930

INVENTOR.
Martin C. Bailey

BY *Lancaster Allwine and Rommel*
ATTORNEYS.

Patented Aug. 4, 1931

1,817,867

UNITED STATES PATENT OFFICE

MARTIN C. BAILEY, OF TREECE, KANSAS

STUFFING BOX AND GLAND

Application filed March 10, 1930. Serial No. 434,647.

The present invention relates to an improved stuffing box and gland construction for use upon centrifugal pumps and other types of machines or apparatus employing a rotary shaft which is directly exposed to liquids or gases under pressure and employing a packing to prevent escape of the liquids or gases along the surface of the shaft.

A primary object of the invention is to provide an improved stuffing box and gland for rotary shafts wherein wear upon the shaft and box is reduced to a minimum and permitting the packing to be held in leakproof engagement about the rotating shaft.

A further object of the invention resides in the arrangement whereby the shaft is supported in an anti-friction bearing in a manner whereby the bearing may be efficiently lubricated so as to prevent wear, and without liability of the lubricant working along the shaft and becoming mixed with the liquid or gases being handled by the machine.

A further object resides in the novel arrangement whereby the stuffing box gland serves as a mounting for the anti-friction bearing supporting the rotary shaft.

Other objects and advantages of the invention will be apparent during the course of the following detailed description, taken in connection with the accompanying drawings forming a part of this specification and in which drawings.

Figure 1:
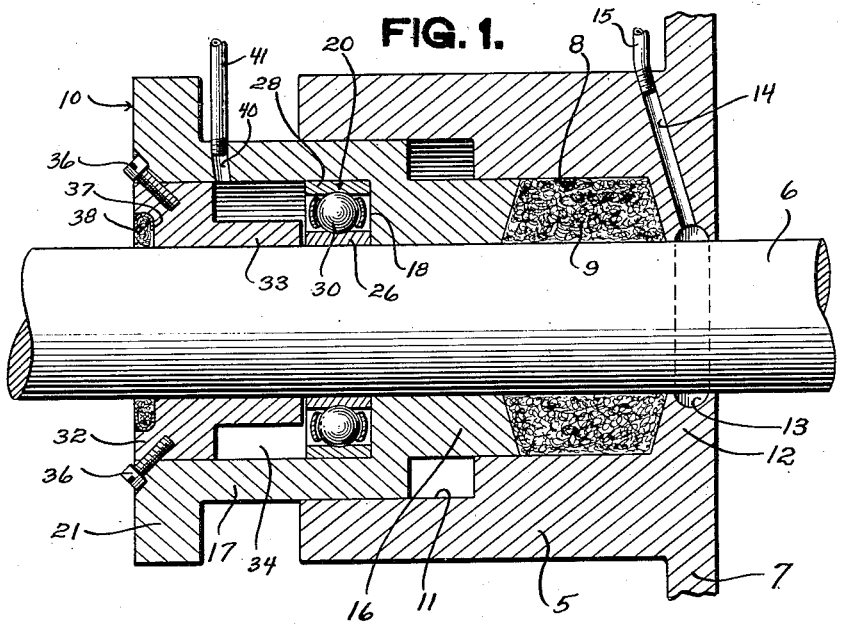
Figure 1 is a central longitudinal section thru the improved stuffing box and gland.
Figure 2:
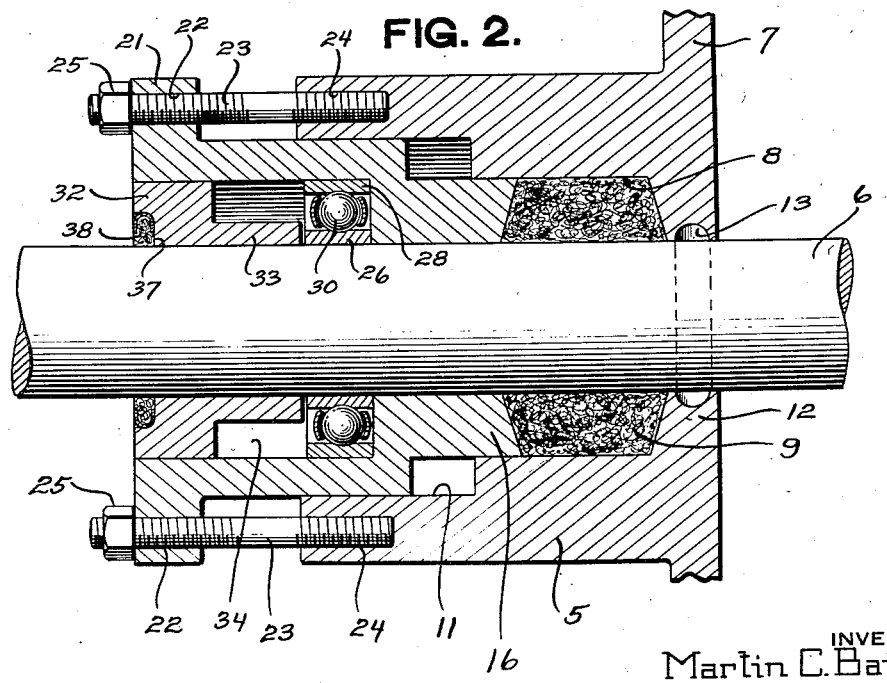
Figure 2 is a central longitudinal section taken at a right angle to the view shown in Figure 1.

In the drawings, and wherein similar reference characters designate corresponding parts thruout the several views, the numeral 5 designates the body of the stuffing box thru which the shaft 6 rotatably extends. The box 5 may either be formed as an integral part of the machine with which it is associated or may be constructed as a separate unit and attached in any suitable manner to the machine. In the example shown the stuffing box has been shown as an integral portion of the fixed casing 7 which may form a wall of the chamber containing liquid or gases under pressure and with which the rotating shaft is in contact. The axial way thru the box 5 is formed intermediate its ends with a packing bore portion 8 for receiving a suitable packing 9 held by the gland 10 to prevent escape of liquids or gases along the surface of the shaft 6. At the outer end of the bore portion 8 the way thru the box is further enlarged as at 11 forming a socket for slidably receiving a portion of the gland 10. The inner end of the box 5 is formed with an internal stop flange 12 forming a passageway for rotatably receiving the shaft 6.

The inner face of the flange 12 is formed with a water seal groove 13 with which a water way 14 communicates and extends to the exterior of the box. The outer end of the way 14 has connected therewith a water seal pipe 15 thru which water is forced into the groove 13 to prevent abrasive material from entering the packing bore portion or packing chamber 8. This water seal groove also serves to prevent air leaks along the shaft 6 and also serve as a cooling medium for the packing 9.

The gland 10 embodies a packing sleeve portion 16 adapted to have sliding movement in the bore portion 8 into engagement with the packing 9 whereby upon longitudinal movement of the gland the packing may be compressed about the shaft 6. Outwardly of the sleeve 16 the gland is formed with a tubular bearing casing 17 of an external diameter to have free sliding movement in the socket 11. The internal diameter of the tubular casing 17 is greater than the internal diameter of the sleeve portion 16 providing an outwardly facing annular shoulder 18 serving as an abutment for an anti-friction bearing 20. At the outer end of the tubular casing or housing 17 the gland is formed with an external annular flange 21 having its inner face in confronting relation with the outer end of the box 5. This flange 21 is provided with diametrically arranged openings 22 for slidably receiving stud bolts 23 which extend parallel to the axis of the shaft 6 and have their inner ends threaded into the box 5 as at 24. Threaded upon the outer end of each stud bolt 23 is a nut 25 adapted to bear against the outer surface of the flange 21 whereby the gland may be moved axially into the box 5 for compressing the packing 9.

The anti-friction bearing 20 may either be of the roller or ball type and may either be of a multiple row or single type as shown. In the example shown, the bearing 20 embodies the inner and outer races 26 and 28 respectively between which are arranged the annular series of balls 30. The bearing 20 has a sliding fit into the tubular housing 17 into abutting engagement with the shoulder 18. The inner bearing race 26 is adapted to turn with the shaft 6 while the outer race 28 has such a snug fit in the tubular housing as to be held against rotation.

Removably fitting in the tubular bearing casing or housing 17 and rotatably receiving the shaft 6 therethru is a bearing retainer 32 the outer end portion of which has a sliding oil tight fit within the casing 17. The inner end of the retainer 32 is reduced in diameter as at 33 forming an annular lubricant chamber 34 at the outer side of the anti-friction bearing 20. The reduced sleeve portion 33 has its inner end either slightly spaced from or in light bearing contact with the inner bearing race 26. The bearing retainer 32 is mounted against rotation by means of suitable retaining screws 36. These screws 36 will also connect the retainer for axial movement with the gland 10. The outer end face of the retainer 32 is formed with an annular groove 37 for receiving a felt grease retaining ring 38 serving to prevent escape of lubricant from the chamber 34 along the surface of the rotating shaft 6.

The tubular portion 17 is provided with an oil opening 40 to which a suitable conductor 41 may be connected for supplying a lubricant to the chamber 34 for lubrication of the bearing 20. The chamber 34 forms an efficient means for positive lubrication of the anti-friction bearing 20. It will be noted that the anti-friction bearing and lubricating chamber for the bearing are disposed outwardly of the packing 9 so that there is little or no likelihood of the liquid or gases under pressure working along the surface of the shaft and diluting the lubricant. This relation of the constantly lubricated roller bearing to that portion of the shaft exposed to the liquid or gases will also prevent passage of the lubricant along the shaft for mixing with the liquid or gases being handled by the machine with which the stuffing box and gland is associated.

While the shaft 6 has a rotating fit in each of the portions 12, 16 and 32, the shaft is supported for rotation in the anti-friction bearing 20. Since the bearing 20 is constantly lubricated there will be little or no wear between the box and shaft and therefore the packing 9 may be effectively held against the shaft.

Changes in detail may be made to the form of invention herein shown and described, without departing from the spirit of the invention or the scope of the following claims.

I claim:

1. A stuffing box for rotary shafts comprising a box body thru which the shaft extends, a packing about the shaft, a stuffing gland for the packing, and anti-friction bearing means between the shaft and gland and carried by the gland in its movement longitudinally of the shaft.

2. A stuffing box for rotary shafts comprising a box body thru which the shaft extends, a packing about the shaft at the inner end of the box body, a non-rotatable stuffing gland movable axially into the outer end of the box body, an anti-friction bearing between the shaft and gland, retaining means for the bearing to cause it to move with the gland in its movement longitudinally of the shaft, an annular lubricant chamber for the bearing, and means for moving the gland axially for compressing said packing.

3. In a mounting for rotary shafts, a stuffing box thru which the shaft extends, a gland movable axially along the shaft into the outer end of the stuffing box and embodying a tubular casing portion having an internal diameter greater than the diameter of the shaft and providing an outwardly facing annular shoulder, an anti-friction bearing in abutting engagement with the shoulder embodying inner and outer races engaging the shaft and casing portion respectively, a retainer movable into the outer end of the tubular casing portion and embodying a reduced sleeve portion engageable with the inner race of the bearing, said sleeve portion forming an annular lubricant chamber, and a lubricant passageway formed thru the casing portion for communicating with the lubricant chamber.

4. In a mounting for rotary shafts, a stuffing box including a box body thru which the shaft extends, a packing about the shaft at the inner end of the box body, a stuffing gland for the packing including a tubular casing portion of greater internal diameter than the diameter of the shaft and forming an outwardly facing annular shoulder, an anti-friction bearing in engagement with the shoulder, a retainer for the bearing including a portion having a leak proof fit into the outer end of the casing portion and a reduced sleeve portion engageable with the bearing and defining an annular lubricant chamber, means for securing the retainer in the casing portion, and a grease retaining ring carried by the outer end portion of the bearing retainer engaging about the shaft.

5. In a mounting for rotary shafts the combination with a stuffing box and a packing in he box, of a gland movable axially into the outer end of the box body into engagement with the packing and embodying a tubular casing portion defining an outwardly facing annular shoulder, an anti-friction bearing engageable at one side with said shoulder embodying an inner race for rotation with the shaft and an outer race held against rotation in the casing portion, a retainer for closing the outer end of the casing portion and embodying a reduced sleeve portion forming an annular lubricant chamber, means securing the retainer to the gland for movement therewith, a grease retainer ring carried by the bearing retainer, and means for admitting lubricant into the lubricant chamber.

6. In a combined bearing and stuffing box gland, a packing sleeve, a tubular bearing casing portion coaxially with the packing sleeve and defining an outwardly facing annular shoulder, an anti-friction bearing arranged in the casing portion in engagement at one side with the shoulder, a bearing retainer slidably fitting into the outer end of the casing portion and embodying a reduced sleeve portion engageable with the outer side of the bearing, said retainer having a shaft receiving opening therethru of a diameter equal to the internal diameter of the packing sleeve, and means securing the retainer in the casing portion.

MARTIN C. BAILEY.